(12) United States Patent
Bonnet et al.

(10) Patent No.: US 8,238,110 B2
(45) Date of Patent: Aug. 7, 2012

(54) DEVICE TO SHIELD AGAINST INTERFERENCE FROM ELECTRICAL APPLIANCES

(75) Inventors: Eric Bonnet, Paris (FR); Gary Didier, Paris (FR); Lilian Vassy, Paris (FR)

(73) Assignee: Ingenico France, Neuilly sur Seine (FR)

( * ) Notice: Subject to any disclaimer, the term of this patent is extended or adjusted under 35 U.S.C. 154(b) by 594 days.

(21) Appl. No.: 12/302,762

(22) PCT Filed: May 31, 2007

(86) PCT No.: PCT/FR2007/000906
§ 371 (c)(1),
(2), (4) Date: Nov. 26, 2008

(87) PCT Pub. No.: WO2007/141410
PCT Pub. Date: Dec. 13, 2007

(65) Prior Publication Data
US 2010/0008057 A1    Jan. 14, 2010

(30) Foreign Application Priority Data
Jun. 2, 2006  (FR) ...................... 06 04952

(51) Int. Cl.
*H05K 5/00*    (2006.01)
(52) U.S. Cl. ...................... 361/752; 361/832; 200/50.01; 200/50.02; 307/116; 307/118; 307/119; 257/688; 257/727; 29/830; 29/841

(58) Field of Classification Search .................. 361/752, 361/832; 200/50.01, 50.02; 307/116, 118, 307/119; 257/688, 727; 29/830, 841
See application file for complete search history.

(56) References Cited

U.S. PATENT DOCUMENTS

| | | | | |
|---|---|---|---|---|
| 6,921,988 B2 * | 7/2005 | Moree | ........................... | 307/119 |
| 7,790,993 B2 * | 9/2010 | Leon | ........................... | 200/50.02 |
| 2003/0047433 A1 * | 3/2003 | Moree | ........................ | 200/50.01 |
| 2008/0230355 A1 * | 9/2008 | Leon | ........................... | 200/50.02 |

FOREIGN PATENT DOCUMENTS

| | | |
|---|---|---|
| DE | 20 2005 017 140 | 2/2006 |
| FR | 2 806 507 | 9/2001 |
| FR | 2 815 733 | 4/2002 |
| FR | 2 860 643 | 4/2005 |

* cited by examiner

*Primary Examiner* — Xiaoliang Chen
(74) *Attorney, Agent, or Firm* — Blakely, Sokoloff, Taylor & Zafman

(57) ABSTRACT

The invention concerns an anti-interference advice for a housing (1) including at least two electrically conductive terminals (32, 33) distinctly positioned on an electronic card (30) and connected to processing means, a protective circuit (45) positioned relative to the two electrically conductive terminals (32, 33) in such a manner as to close the electrical circuit during the normal utilization position of the housing (1), the protective circuit (45), including means adapted for opening the electrical circuit closed in response to a deterioration in the protective circuit (45).

8 Claims, 1 Drawing Sheet

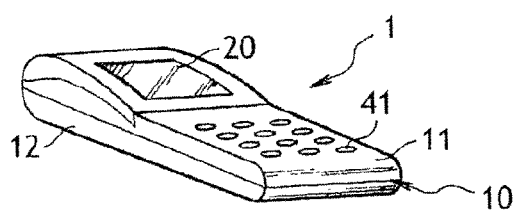
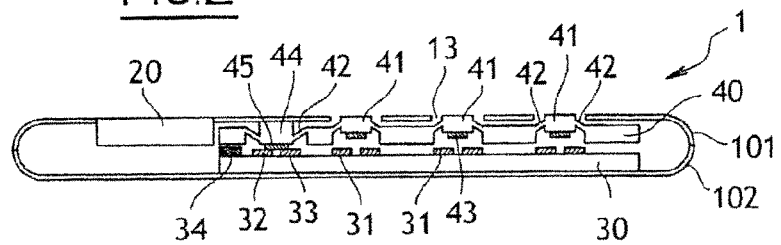
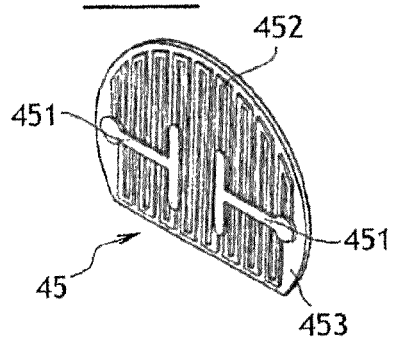
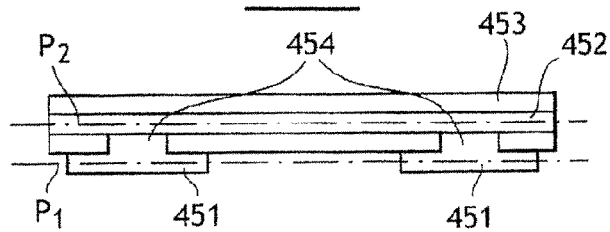
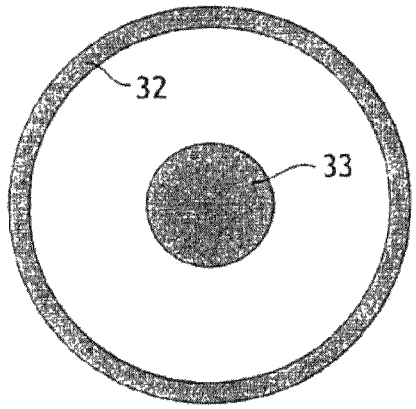
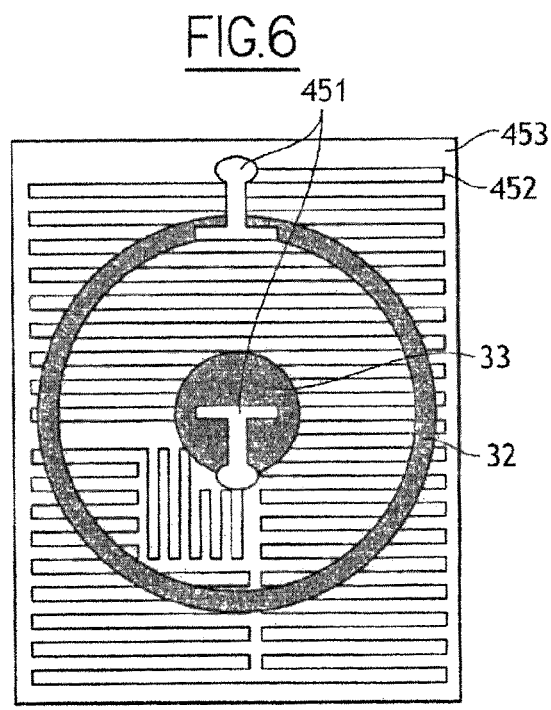

DEVICE TO SHIELD AGAINST INTERFERENCE FROM ELECTRICAL APPLIANCES

This is a non-provisional application claiming the benefit of International application number PCT/FR2007/000906 filed May 31, 2007.

The present invention relates to the general technical field of protection against intrusions of electronic devices.

More particularly, the present invention relates to the technical field of protection against intrusions of electronic devices which may have a keyboard for entering confidential data.

It is notably suitable for electronic payment terminals, portable telephones, computers, or any other type of terminal on which a user has to enter confidential data.

GENERAL PRESENTATION OF THE BACKGROUND AND PRIOR ART

The purpose of a fraud on a secured terminal consists of attempting to detect confidential information stored in this terminal or entered by a user on such a terminal in order to reuse them to his/her expense.

A known means for fraudulently accessing confidential information entered by the user consists of incorporating spies into the terminal in order to detect the keys pressed by the user.

Incorporating spies into the terminal requires the opening of this terminal.

Solutions have already been proposed for guaranteeing the security of terminals on which confidential information has to be entered.

Document FR 2 815 733 describes a security device for a casing comprising a cap, an electronic card and a flexible membrane on which keys are molded.

The security device comprises a dedicated key of the membrane designated as <<false key>> hereafter.

The security device also comprises two electrically conducting terminals positioned on the electronic card facing the false key and connected to processing means of the casing.

The false key includes at its base an electrically conducting portion which faces both terminals.

In a normal operating condition of the casing, the false key is maintained pressed down with a determined force in order to close an electric circuit for detecting intrusion.

The opening of the casing by a third party for inserting spies therein induces an opening of the electric detection circuit caused by the release of the false key.

This opening of the circuit is detected by processing means of the device which activates anti-fraud functions of the casing, as for example shutdown of the casing or even deletion of confidential data.

However, a drawback of this type of device is that it does not comprise any means for protecting the false key against possible hacking.

Thus, a malevolent third party who manages to short-circuit the false key makes the security device inoperative, so that a subsequent opening of the casing is not detected and does not cause activation of the anti-fraud functions of the casing.

An object of the present invention is to propose an improved device for protection against intrusions of electronic devices containing a keyboard for entering confidential data.

PRESENTATION OF THE INVENTION

For this purpose, an anti-intrusion device is provided for a casing comprising:

- at least two distinct electrically conducting terminals positioned on an electronic card and connected to processing means,
- at least one mobile component including a protection circuit positioned facing both electrically conducting terminals and connecting the electrically conduction terminals so as to close an electric circuit in a normal position of use of the casing, wherein the protection circuit comprises at least one electrically conducting track positioned so as to be severed upon an intrusion by piercing or cutting at the mobile component.

Preferred but non-limiting aspects of the activation method according to the invention are the following, either alone or combined:

- the mobile component and the protection circuit are positioned so as to ensure the opening of the closed electrical circuit following displacement of the casing relatively to the device,
- suitable means for ensuring the opening comprise at least one electrically conducting track,
- the electrically conducting track is positioned in a substrate,
- the substrate comprises at least two connection tracks positioned on one of the faces of the substrate, the second connection tracks extending in a plane distinct from a plane in which the electrically conducting track extends and being connected to the latter through at least two bridges,
- the connection tracks are made in carbon and the electrically conducting track is made in copper for example,
- the connection tracks are positioned in a central region of the substrate,
- the electrically conducting track is a mesh-shaped track,
- the pitch of the mesh is less than 1 millimeter, preferentially less than 0.5 millimeters, and even more preferentially about equal to 0.3 millimeters,
- the substrate may be flexible and covers totally or partly the upper surface of the electronic card,
- an opaque layer is positioned on the substrate or the substrate is in an opaque material,
- the electrically conducting terminals of the electronic card should have symmetry of revolution.

PRESENTATION OF THE FIGURES

Other features, objects and advantages of the present invention will further become apparent from the following description, which is purely illustrative and non-limiting and which should be read with reference to the appended drawings wherein:

FIG. 1 illustrates in a perspective view a casing comprising an embodiment of the anti-intrusion device according to the invention, FIG. 2 is a sectional view of the casing illustrated in FIG. 1, FIG. 3 is a perspective illustration of an embodiment of a protection circuit for the anti-intrusion device according to the invention, FIG. 4 is a sectional view of the protection circuit illustrated in FIG. 3, FIG. 5 is a top view of an embodiment of connecting terminals of the device according to the invention, FIG. 6 illustrates an embodiment of the protection circuit and of the connecting terminals illustrated in FIG. 5.

DESCRIPTION OF THE INVENTION

With reference to FIGS. 1 and 2, an exemplary casing 1 is illustrated, comprising the anti-intrusion device according to the invention.

The casing 1 comprises a cap 10, a display screen 20, an electronic card 3 and a flexible membrane 40.

The cap 10 consists of a top cap portion 101 and of a lower cap portion 102.

The display screen 20 is attached to the upper cap portion 101.

The electronic card 30 is a printed circuit comprising processing means and distinct interlaced electrically conducting contacts 31 intended to face keys of the flexible membrane 40 being used as entry means. These contacts 31 are for example made in metal. The electrically conducting contacts 31 are connected to processing means 34, for example of the microprocessor type.

The flexible membrane 40 is for example made in silicone or polyurethane. This membrane 40 comprises molded keys 41, each key 41 corresponding to a portion of the membrane connected to the remainder of the membrane through a peripheral lip 42. Each key 41 crosses the upper cap portion 101 through an aperture 13 of the latter so as to be accessible from the outside. Each key 41 comprises an electrically conducting portion 43 on its face facing the electronic card 30. Each key 41 is positioned facing both electrically conducting contacts 31.

According to the standard operating mode of a membrane keyboard, by pressing on a key 41 of the keyboard, the corresponding electrically conducting portion 43 may be connected with both underlying contacts 31 so as to close an electric circuit on the electronic card 30. This closure is detected by the processing means which store in a memory the value corresponding to the pressed key.

The casing 1 includes an anti-intrusion device comprising at least one mobile component 44. This mobile component is a false key 44 provided at the membrane 40 and which is not visible from the outside of the casing 1.

The false key 44 is, similarly to the keys 41, connected to the remainder of the membrane 40 by a peripheral lip 42 and comprises a protection circuit 45 positioned facing both electrically conducting terminals 32, 33 and connecting the electrically conducting terminals 32, 33 so as to close an electric circuit (designated as the closed electric circuit hereafter) in a normal position of use of the casing, i.e. when the upper cap portion 101 is attached to the lower cap portion 102. The protection circuit will be described in more detail subsequently.

Both electrically conducting terminals 32, 33 of the electronic card are positioned facing each other under the false key 44. Both electrically conducting terminals 32, 33 form two portions of a security line connected to the processing means 34.

The processing means 34 are adapted in order to determine whether both electrically conducting terminals 32, 33 are electrically connected, for example by measuring the resistance between the terminals of the security line.

When an individual attempts to access the contents of the casing 1, by removing the upper cap portion 101, the false key 44 is no longer actuated by the upper cap portion 101 and is brought back by the action of the lip 42 towards a rest position in which the electrically conducting protection circuit 45 is no longer in contact with the electrically conducting terminals 32, 33.

The processing means detect a change in the resistance of the security line, indicating that an attempt to open the device 10 is taking place, and apply anti-fraud functions of the casing, such as for example the shutdown of the casing 1 or further deletion of confidential data stored in a memory of the casing 1.

With reference to FIG. 3, an embodiment of the protection circuit 45 is illustrated.

The protection circuit 45 comprises connection tracks 451, a substrate 453 and suitable means for ensuring the opening of the closed electric circuit.

The suitable means for ensuring the opening of the closed electric circuit enable the closed electric circuit to be opened in response to deterioration of the protection circuit (by piercing, cutting, etc.); or enable a resistance change to be detected due to a change in the pressure force exerted by the casing.

Thus, with the suitable means, the failure of an electric contact may be detected, either by displacement of the device by its mobility, or by opening by deterioration of the protection circuit.

The suitable means comprise at least one electrically conducting track 452.

In the embodiment illustrated in FIGS. 3 and 4, the electrically conducting track 452 is positioned inside the substrate 453.

With this, industrial scale production of the protection circuit 45 may be facilitated. Moreover, the protection circuit 45 may also be adapted on the existing casing comprising a false key 44 such as the casings described in document FR 2 815 733 by attaching with clips the protection circuit at the base of the false key.

The electrically conducting track 452 may be made in copper with a very fine pitch, industrially.

The electrically conducting track 452 is positioned so as to be severed during an intrusion by piercing or cutting at the false key.

More specifically, the width of the electrically conducting track 452 and the distance separating two adjacent portions of the track 452 (no protective mesh) are provided so as to be sufficiently narrow for inducing severing of the conducting track 452 upon an intrusion by piercing or cutting.

An exemplary embodiment of the protection circuit is the following:
- diameter of the protection circuit=10 millimeters,
- height of the protection circuit=0.25 millimeters,
- width of the protection track=0.15 millimeters,
- pitch of the mesh less than 1 millimeter, preferentially less than 0.5 millimeters, and even more preferentially about equal to 0.3 millimeters.
- materials used for forming the protection circuit:
    - Substrate: epoxy or polyethylene naphthalate (PEN),
    - Tracks of the mesh: copper,
    - Connection tracks: carbon or silver or gold.

Advantageously, this exemplary protection circuit may be used with a false key with a diameter of 6 millimeters.

In one embodiment, the electrically conducting track 452 is a track in the shape of a mesh.

By <<mesh>>, within the scope of the present invention, is meant a rectangular wave pattern as illustrated in FIG. 3, or a spiral pattern.

Moreover, the mesh may be two-dimensional (2D) or three-dimensional (such as for example a grid pattern of the tennis racket type).

Finally, the mesh may be made over several layers separated by an additional substrate thickness.

The connection tracks 451 are positioned on one of the faces of the substrate 453. In the embodiment illustrated in FIGS. 3 and 4, the connection tracks 451 are two in number. The connection tracks 451 extend in a plane P1 distinct from a plane P2 in which the electrically conducting track 452 extends. The planes P1 and P2 are electrically insulated (by an insulator 455), except in the area where the bridges 454 are found.

Both connection tracks 451 are connected to the electrically conducting track 452 through at least two electrically conducting bridges 454 illustrated in FIG. 4.

The fact that the connection tracks 451 and the electrically conducting track 452 extend in distinct planes ensures a failure of the closed electric circuit regardless of the area of the protection circuit 45 in which piercing or cutting is accomplished.

In certain embodiments, the connection tracks 451 are positioned in a central region of the substrate 453. The difficulty of short-circuiting the protection circuit 45 may thereby be increased.

Both connection tracks 451 are intended to respectively come into contact with one of the two connection terminals 32, 33, positioned on the electronic card 30.

In one embodiment, the substrate 453 comprises an opaque layer. Thus, the electrically conducting track 452 positioned inside the substrate 453 is not visible from the outside. Also, the position of the connection tracks 451 is not visible from the outside when the protection circuit 45 is in place. With this it is possible to increase the difficulty for a malevolent third party to short-circuit the protection circuit 45.

In one embodiment, the substrate 453 covers a more extended surface area than the region in which the electrically conducting terminals 32, 33 are found. It is thus possible to protect a more extended area of the electronic card than the false key 44.

In one embodiment, the substrate 453 is a flexible substrate which covers the whole surface of the electronic card 30 and is adhesively bonded onto the electronic card. In this case, the connection tracks 451 are for example made in carbon in order to ensure tearing off of the connection tracks 451 upon an attempt to detach the flexible substrate 453.

In the embodiment illustrated in FIG. 4, the protection circuit comprises 4 layers of different components:
- the epoxy substrate 453,
- the copper mesh 452,
- a layer of insulating varnish comprising two recesses so that the varnish layer does not cover the layer comprising the copper mesh at said recesses,
- a carbon ink layer deposited at the recesses by screen printing so that the carbon communicates with the layer of copper mesh: these communications form the bridges 454.

In one embodiment illustrated in FIG. 5, the electrically conducting terminals 32, 33 have a symmetry of revolution. In this case, and as illustrated in FIG. 6, the connection tracks 451 are adapted to the shape of the electrically conducting terminals 32, 33 so that one of the connection tracks comes into contact with one of the connection terminal 32, and the other of the connection tracks 451 is in contact with the other one of the connection terminals 33. With this, bringing the electrically conducting terminals 32, 33 in contact with the connection tracks 451 may be facilitated, regardless of the orientation of the device.

The reader will have understood that many changes may be provided without materially departing from the novel teachings and advantages described herein.

For example, the protection circuit 45 may not comprise any substrate, the electrically conducting track 452 being in this case, positioned inside the flexible membrane 40 comprising the keys, and the connection tracks being positioned on the face of the membrane facing the electronic card, facing the connection terminals.

Moreover, the casing may comprise a plurality of false keys.

Finally, although the anti-intrusion device according to the invention has been described in the case of a casing on which a user enters confidential data, the present invention may also be applied in terminals which do not have input means but in which confidential information is stored. In this case, detection by the processing means of the opening of the terminal for example causes deletion of the confidential data stored in this terminal.

The false key may be alone and dissociated from a keyboard membrane, in order to provide the same function for protecting an electronic casing, in the case when the latter does not include any keyboard or for detecting the opening of the lower portion of the casing.

References
1 casing,
10 cap,
101 upper cap portion,
102 lower cap portion,
13 through-opening,
20 display screen,
30 electronic card,
31 electrically conducting contact of the keys of the keyboard,
32, 33 electrically conducting terminals of the false keys,
40 flexible membrane,
41 key,
42 lip,
43 electrically conducting portion,
44 false key,
45 protection circuit,
451 connection track,
452 electrically conducting track,
453 substrate,
454 electrically conducting bridge,
455 insulating layer

The invention claimed is:

1. An anti-intrusion device for a casing comprising:
   at least two distinct electrically conducting terminals positioned on an electronic card and connected to processing means,
   at least one mobile component including a protection circuit positioned facing both of the electrically conducting terminals and connecting the electrically conducting terminals so as to close an electric circuit in a normal position of use of the casing,
   the protection circuit comprises at least one electrically conducting track positioned so as to be severed upon an intrusion by piercing or cutting at the mobile component,
   the mobile component and the protection circuit being positioned so as to ensure the opening of the closed electric circuit following displacement of the casing relative to the device,
   wherein the electrically conducting track is a mesh-shaped track, and the pitch of the mesh or the mesh-shaped track is at least one of less than 1 millimeter, less than 0.5 millimeter, and about equal to 0.3 millimeter.

2. The device according to claim 1, wherein the electrically conducting track is positioned in at least one substrate.

3. The device according to claim 2, wherein the substrate comprises at least two connection tracks positioned on one of the faces of the substrate, both connection tracks extending in a plane distinct from a plane in which the electrically conducting track extends and being connected to the latter through at least two bridges.

4. The device according to claim 3, wherein the connection tracks are made in carbon and the electrically conducting track is made in copper.

5. The device according to claim 3 or 4, wherein the connection tracks are positioned in a central region of the substrate.

6. The device according to claim 2, wherein the substrate is flexible and totally covers the upper surface of the electronic card.

7. The device according to claim 2, wherein the substrate comprises an opaque layer.

8. The device according to claim 1, wherein the electrically conducting terminals of the electronic card have symmetry of revolution.

\* \* \* \* \*

UNITED STATES PATENT AND TRADEMARK OFFICE
CERTIFICATE OF CORRECTION

PATENT NO. : 8,238,110 B2
APPLICATION NO. : 12/302762
DATED : August 7, 2012
INVENTOR(S) : Eric Bonnet et al.

Page 1 of 1

It is certified that error appears in the above-identified patent and that said Letters Patent is hereby corrected as shown below:

In the Claims, Column 6, Claim 1, line 57, please delete "or" and insert -- of --.

Signed and Sealed this
Twenty-second Day of January, 2013

David J. Kappos
*Director of the United States Patent and Trademark Office*